(12) United States Patent
Ito et al.

(10) Patent No.: US 7,311,996 B2
(45) Date of Patent: Dec. 25, 2007

(54) NON-AQUEOUS ELECTROLYTE SECONDARY BATTERY

(75) Inventors: Hidetoshi Ito, Kanagawa (JP); Yoshiaki Naruse, Kanagawa (JP); Takeru Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 553 days.

(21) Appl. No.: 10/472,797

(22) PCT Filed: Jan. 28, 2003

(86) PCT No.: PCT/JP03/00808

§ 371 (c)(1),
(2), (4) Date: Sep. 24, 2003

(87) PCT Pub. No.: WO03/067688

PCT Pub. Date: Aug. 14, 2003

(65) Prior Publication Data

US 2004/0099526 A1   May 27, 2004

(30) Foreign Application Priority Data

Feb. 4, 2002   (JP) .............................. 2002-027201

(51) Int. Cl.
*H01M 4/02*       (2006.01)

(52) U.S. Cl. .................. 429/209; 429/122; 429/231.8; 204/291

(58) Field of Classification Search ................ 429/122, 429/216, 209, 231.8; 204/291
See application file for complete search history.

(56) References Cited

FOREIGN PATENT DOCUMENTS

| | | |
|---|---|---|
| JP | 08-321326 | 12/1996 |
| JP | 11-45740 A | 2/1999 |
| JP | 2001-68154 A | 3/2001 |
| JP | 2002-141058 A | 5/2002 |

*Primary Examiner*—Laura Weiner
(74) *Attorney, Agent, or Firm*—Robert J. Depke; Rockey, Depke & Lyons, LLC.

(57) ABSTRACT

The present invention relates to a non-aqueous electrolyte secondary battery in which a spirally coiled battery element obtained by spirally coiling an anode (3) and a cathode (2) through a separator (4) is accommodated in a battery can (5) filled with a non-aqueous electrolyte. A fluoride $MF_n$ (M indicates at least one metal selected from between Cu, Ni, Ag, Ti, Sn and Cr, and n is an integer.) is included in the anode before an initial charging operation, and assuming that the initial charging capacity of the battery is Q [mAh] and a Faraday constant is F [C/mol], an amount m [mol] of the fluoride $MF_n$ included in the anode is located within a range represented by the following expression $0.0036\ Q/nF \leq m \leq 0.36\ Q/nF$.

2 Claims, 2 Drawing Sheets

NON-AQUEOUS ELECTROLYTE SECONDARY BATTERY

This application claims priority to Japanese Patent Application Number JP2002-027201, file Feb. 4, 2002, which is incorporated herein by reference.

TECHNICAL FIELD

The present invention relates to a non-aqueous electrolyte secondary battery such as a lithium-ion secondary battery, and more particularly to a non-aqueous electrolyte secondary battery high in its energy density and output density and excellent in its charging and discharging cyclic characteristics.

This application claims a priority based on Japanese Patent Application No. 2002-027201 filed in Feb. 4, 2002 in Japan. The earlier application is applied to this application with reference thereto.

BACKGROUND ART

In recent years, various kinds of portable electronic devices are developed and batteries are used as power sources of these electronic devices. For the portable electronic devices, compact and light forms are demanded. For the batteries employed for these devices, compact and light forms are also demanded.

In the electronic devices including the portable electronic devices, the batteries high in their degree of freedom in forms are required so that accommodation spaces may be efficiently used. As a battery which satisfies such a demand, a lithium secondary battery high in its energy density and output density or a lithium-ion secondary battery using a carbon material capable of reversibly doping and dedoping lithium ions for an anode are proposed. Particularly, the lithium-ion secondary battery has been widely put to practical use and widely employed as power sources of portable electronic devices such as camcorders, note book type personal computers, portable telephones, etc.

The lithium secondary battery and the lithium-ion secondary battery have a problem that a discharging capacity is gradually reduced due to the repetition of charging and discharging operations. This phenomenon may sometimes result from the deterioration of performances of materials forming the battery such as a cathode material, a conductive agent, a binding agent, an electrolyte, etc., however, this phenomenon substantially results from a reaction of an anode and an electrolyte. Since the anode serves as a powerful reducing agent under its charged state, the anode is extremely apt to react with the electrolyte. When the anode in its charged state reacts with the electrolyte, the anode is considered to generate a self-discharge. As a result, a difference in depth of charge arises between the anode and the cathode. Since either the cathode or the anode cannot be charged and discharged in the battery, the difference in depth of charge between the anode and the cathode causes the decrease of capacity that cannot be recovered. When the anode reacts with the electrolyte, the anode may be denatured or disintegrated to be deactivated so that the capacity may be possibly decreased.

The above-described reaction of the anode with the electrolyte is suppressed by a passive film formed on the surface of the anode due to a reductive decomposition of the electrolyte upon charging. The formation of the film is accompanied with the self-discharge of the anode as described above. The formed film likewise increases the internal resistance of the battery. That is, when the film is excessively formed, the energy density and the output density are deteriorated. On the contrary, when the film is insufficiently formed, the deterioration of charging and discharging cyclic characteristics cannot be adequately suppressed. Accordingly, in order to make the high energy density and the output density compatible with the excellent charging and discharging cyclic characteristics, a film of good quality needs to be formed as low as possible as required.

DISCLOSURE OF THE INVENTION

It is an object of the present invention to provide a new non-aqueous electrolyte secondary battery that can eliminate the problems of a conventional battery as described above.

It is another object of the present invention to provide a non-aqueous electrolyte secondary battery high in its energy density and output density and excellent in its charging and discharging cyclic characteristics.

A non-aqueous electrolyte secondary battery comprises an anode, a cathode and an electrolyte, in which a fluoride $MF_n$ (M indicates at least one metal selected from between Cu, Ni, Ag, Ti, Sn and Cr, and n is an integer.) is included in the anode before an initial charging operation, and assuming that the initial charging capacity of the battery is Q [mAh] and a Faraday constant is F [C/mol], an amount m [mol] of the fluoride $MF_n$ included in the anode is located within a range represented by the following expression (1).

$$0.0036 \, Q/nF \leq m \leq 0.36 \, Q/nF \tag{1}$$

In the non-aqueous electrolyte secondary battery according to the present invention, since the fluoride $MF_n$ is included in the anode before the initial charging operation, the metallic fluoride is reduced upon initial charging operation and a good film is properly formed by a reaction product.

Still another objects of the present invention and specific advantages obtained by the present invention will be more apparent from the explanation of embodiments described by referring to the drawings.

BEST MODE FOR CARRYING OUT THE INVENTION

Figure 1:
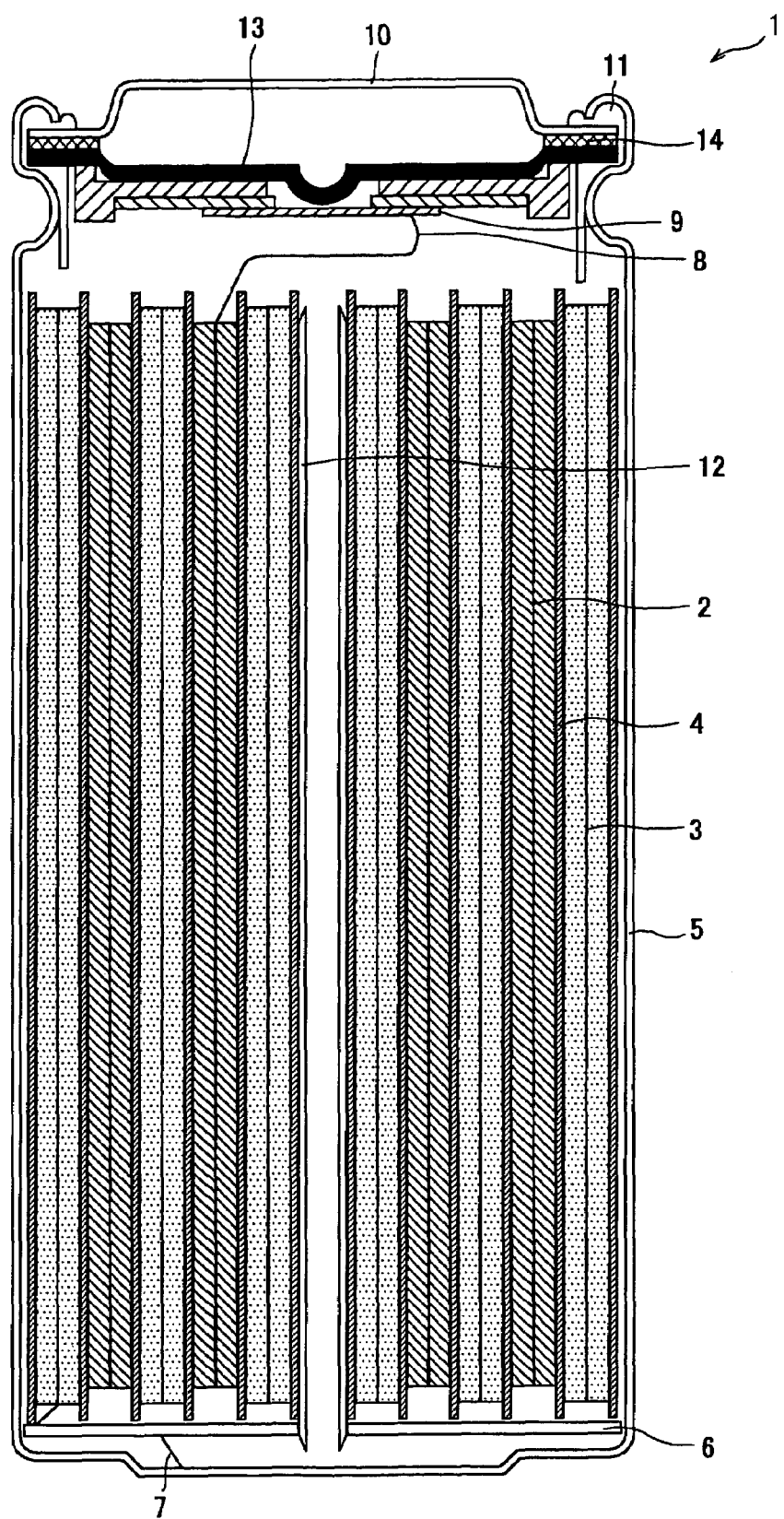
FIG. 1 is a sectional view showing one structural example of a cylindrical non-aqueous electrolyte secondary battery to which the present invention is applied.

Now, embodiments of the present invention will be described in detail by referring to the drawings.

A non-aqueous electrolyte secondary battery 1 to which the present invention is applied has, as shown in FIG. 1, a battery element accommodated in a battery can 5. The battery element is obtained by spirally coiling an elongated cathode 2 and an elongated anode 3 through a separator 4 in a tightly contacted state.

The cathode 2 is produced by applying and drying a cathode composite mixture including a cathode active material and a binding agent on a current collector. As the current collector, a metallic foil such as an aluminum foil is used.

As the cathode active material, for example, lithium composite oxides including lithium and metallic elements, metallic oxides such as $V_2O_5$, metallic sulfides such as $TiS_2$, $MoS_2$, or polymer materials such as polyacetylene or polypyrrole may be exemplified. One or two kinds or more of them may be mixed together and the mixture may be used. Lithium cobalt oxides including lithium, cobalt (Co) and oxygen (O), lithium nickel oxides including lithium, nickel (Ni) and oxygen, or lithium manganese oxides including lithium, manganese (Mn) and oxygen is preferably employed among them, because voltage can be raised and energy density can be improved. As these lithium composite oxides, for instance, materials expressed by a chemical formula $Li_xMI_{1-y}MII_yO_2$ may be exemplified. In the chemical formula, MI indicates at least one kind of element of a first element group including Co, Ni and Mn. MII indicates at least one kind of element of a second element group as described below. The value of x is located within a range of an expression of $0<x\leq1$. The value of y is located within a range of an expression of $0<y\leq1$. Among them, materials including the second elements in addition to lithium and the first elements are preferable, because they are stable in their crystal structure and have high chemical stability. As cathode materials, $LiFePO_4$ or $NbSe_2$ or the like may be used as well as the above-described materials. As the second element group, Al, Mg, Ti, Cr and Fe are preferable. When the cathode is formed by using the above-described cathode active materials, a well-known conductive agent or a binding agent or the like may be added thereto.

The anode 3 is formed by applying and drying an anode composite mixture including an anode active material and a binding agent on a current collector. As the current collector, a metallic foil such as a copper foil is employed.

As the anode active material, for instance, carbon materials capable of doping and dedoping lithium, metallic oxides, polymer materials, etc, may be employed. As the carbon materials, for instance, non-graphitizable carbon or graphite type carbon materials are exemplified. More specifically, graphite, mesocarbon microbeads, carbon fibers such as mesophase carbon fibers, pyrocarbons, coke such as pitch coke, needle coke, petroleum coke, vitreous carbons, and carbon materials such as an organic polymer compound sintered body, activated carbon, etc. may be employed. As the organic polymer compound sintered body, materials obtained by sintering and carbonizing phenolic resin, furan resin or the like at suitable temperature are used.

As the anode materials capable of doping and dedoping lithium, simple substances, alloys or compounds of metallic elements or metalloid elements capable of forming alloys with lithium may be exemplified. The alloys include alloys having one or more kinds of metallic elements and one or more kinds of metalloid elements as well as alloys including two or more kinds of metallic elements. In the structures of the alloys, solid solution, eutectics (eutectic mixture), intermetallic compounds may be included or two or more kinds of them may coexist.

As such metal or metalloid elements, for instance, Sn, Pb, Al, In, Si, Zn, Sb, Bi, Ga, Ge, As, Ag, Hf, Zr, and Y may be exemplified. As alloys or compounds of them, for instance, alloys or compounds represented by a chemical formula, for instance, $Ma_eMb_fLi_g$ or $Ma_hMc_iMd_j$ may be exemplified. In these chemical formulas, Ma designates at least one kind of element of metallic elements and metalloid elements capable of forming alloys or compounds with lithium. Mb designates at least one kind of element of the metallic elements and the metalloid elements except lithium and Ma. Mc designates at least one kind of element of non-metallic elements. Md designates at least one kind of element of the metallic elements and the metalloid elements except Ma. Further, the values of e, f, g, h, i and j are respectively expressed by e>0, f≧0, g≧0, h>0, i>0 and j>0.

Simple substances, alloys or compounds of metallic elements or metalloid element of the group 4B are preferable among them. Si or Sn, or alloys or compounds thereof are especially preferable. They may be crystalline or amorphous.

As the specific examples of the above-described alloys or compounds, are enumerated LiAl, AlSn, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_k$ ($0<k\leq2$), $SnO_l$ ($0<l\leq2$), $SnSiO_3$, LiSiO, LiSnO, etc. As the anode materials capable of doping and dedoping lithium, any one kind of them may be used or two or more kinds of them may be mixed together and the mixture may be used. When the anode is formed from these materials, a well-known binding agent or the like may be added thereto.

The non-aqueous electrolyte secondary battery includes a fluoride $MF_n$ in the anode before a first charging operation (M indicates at least one metal selected from between Cu, Ni, Ag Ti, Sn and Cr, and n is an integer.). The fluoride $MF_n$ is reduced by a reaction represented by a below-described expression (2) upon first charging operation of the battery to release a fluoride ion. The fluoride ion reacts with electrolyte salt or a solvent present near the anode to form a film with good quality on the anode.

$$MF_n + ne^- \rightarrow M + nF^- \quad (2)$$

This film prevents the reaction of the anode with electrolyte solution, which causes the deterioration of a capacity with the repetition of cycles, so that high energy density and output density can be made compatible with charging and discharging cyclic characteristics.

When the fluoride ions are dissolved in a non-aqueous electrolyte, the film can be also formed on the anode. In this case, however, the fluoride ions reaching the cathode bring such bad effects as the generation of gas or the degradation of the cathode active material. On the other hand, the fluoride ions produced from the fluoride in the anode are preferably rapidly consumed for forming the film without the above-described bad effects.

The reducing reaction of the fluoride causes an electric current that does not contribute to the charge of the active material to be consumed in the anode. Thus, a difference in depth of charge is generated between the cathode and the anode. Since the reductive decomposition reaction of an electrolyte after that is suppressed by the once formed film with good quality, the charging and discharging cyclic characteristics are improved. Then, metal M produced by reducing the fluoride serves as a conductive agent of the anode and does not prevent charging and discharging reactions.

As the fluoride included in the anode, fluorides of metals such as Cu, Ni, Ag, Ti, Sn and Cr may be exemplified. Specifically, $CuF_2$, $NiF_2$, AgF, $AgF_2$, $TiF_3$, $TiF_4$, $SnF_2$, $CrF_2$, $CrF_3$, $CrF_4$, etc. may be used. $CuF_2$ and $NiF_2$ in which compounds are relatively easily treated and simple metallic substances produced by a reducing reaction do not form alloys with lithium are especially preferable among them.

The fluoride in the form of powder is dissolved in a suitable solvent such as cold water to be mixed with the anode active material and the dissolved fluoride is applied to the anode. Then, the fluoride can be added to the anode by a method for drying the solvent or the like. Assuming that the initial charging capacity of the battery is Q [mAh] and a Faraday constant is F [C/mol], an amount m [mol] of addition of the fluoride $MF_n$ is desirably located within a range represented by the following expression (3).

$$0.0036 \, Q/nF \leq m \leq 0.36 \, Q/nF \quad (3)$$

When the amount of addition of the fluoride is excessively smaller than 0.0036 Q/nF [mol], an effect of improving the cyclic characteristics is not exhibited. When the amount of addition of the fluoride is excessively larger than 0.36 Q/nF [mol], the charging and discharging cyclic characteristics are improved, however, a battery capacity is lowered.

The non-aqueous electrolyte is prepared by dissolving electrolyte salt in a non-aqueous solvent.

As a main solvent of the non-aqueous solvent, various kinds of non-aqueous solvents that have been hitherto used for non-aqueous electrolyte solution may be employed. For example, may be employed propylene carbonate (PC), ethylene carbonate (EC), dimethyl carbonate (DMC), diethyl carbonate, ethyl methyl carbonate, dipropyl carbonate, methyl propyl carbonate, ethyl propyl carbonate, dibutyl carbonate, butyl methyl carbonate, butyl ethyl carbonate, butyl propyl carbonate and solvents obtained by replacing hydrogen atoms of these carbonic esters by halogen atoms, ybutyrolactone, dimethoxyethane, tetrahydrofuran, 2-methyl tetrahydrofuran, 1,3-dioxolane, 4-methyl-1,3-dioxolane, diethyl ether, sulfolane, methyl sulfolane, methyl sulfolane butyrate, acetonitrile, propionitrile, methyl propionate, etc. These non-aqueous solvents may be independently used and a plurality of kinds of non-aqueous solvents may be mixed together and the mixture may be used.

As the electrolyte salt, at least one compound of $LiPF_6$, $LiBF_4$, $LiCF_3SO_3$, $LiN(CF_3SO_2)_2$, $LiN(C_2F_5SO_2)_2$, etc. may be desirably employed.

As described above, the cathode 2 and the anode 3 are tightly coiled through the separator 4 many times in a coiled form to form a spirally coiled body. The spirally coiled body is accommodated in a battery can 5 made of iron whose inside is plated with nickel. At this time, the spirally coiled body is mounted on an insulating plate 6 disposed on the bottom part of the battery can 5.

One end of an anode lead 7 made of, for instance, nickel for collecting an electric current of the anode is attached to the anode 3 under pressure and the other end is welded to the battery can 5. Thus, the battery can 5 is electrically conducted to the anode 3 and forms an external anode of the non-aqueous electrolyte secondary battery 1.

One end of a cathode lead 8 made of, for instance, aluminum for collecting an electric current of the cathode 2 is attached to the cathode 2 and the other end is electrically connected to a battery cover 10 through a current cutting off thin plate 9. Thus, the battery cover 10 is electrically conducted to the cathode 2 and forms an external cathode of the non-aqueous electrolyte secondary battery 1. The current cutting off thin plate 9 cuts off the electric current in accordance with the internal pressure of the battery.

Non-aqueous electrolyte solution is injected into the battery can 5 to immerse the spirally coiled body therein. An insulating sealing gasket 11 to which asphalt is applied is interposed between the battery can 5 and the battery cover 10 and an opening side is caulked so that the battery can 5 is sealed.

The non-aqueous electrolyte secondary battery 1 according to the present invention has, as shown in FIG. 1, a center pin 12 provided for connecting to the anode lead 7 and the cathode lead 8. Further, the non-aqueous electrolyte secondary battery is provided with a safety valve device 13 for purging gas in an inner part when pressure in the battery is higher than a prescribed value and a PTC element 14 for preventing the rise of temperature in the battery.

Since the above-described non-aqueous electrolyte secondary battery 1 has the fluoride $MF_n$ included in the anode before the first charging operation, the metal fluoride is reduced upon first charging operation so that the film with good quality is suitably formed by a reaction product. This film prevents the reaction of the anode with the electrolyte solution, so that the high energy density and output density are compatible with the charging and discharging cyclic characteristics.

In the above-described embodiment, although the non-aqueous electrolyte secondary battery using the battery can employing the non-aqueous electrolyte solution is described as an example, the present invention is not limited thereto. The present invention may be applied to a solid electrolyte battery using a solid polymer electrolyte including simple substances or the mixture of conductive polymer compounds or a gel electrolyte battery using a gel electrolyte in which non-aqueous electrolyte solution is gelled by a polymer matrix. For instance, when the gel electrolyte or the solid electrolyte or the like is used as the non-aqueous electrolyte, a thin battery using a laminate film as an outer package material may be formed without using the battery can.

As the polymer matrix, polyvinylidene fluoride (PVdF), polyacrylonitrile, polyethylene oxide, polypropylene oxide, polymethacrylonitrile, etc. are exemplified. Any polymer matrix is selected and used from among them in accordance with its use state (gel state, solid state).

Figure 2:
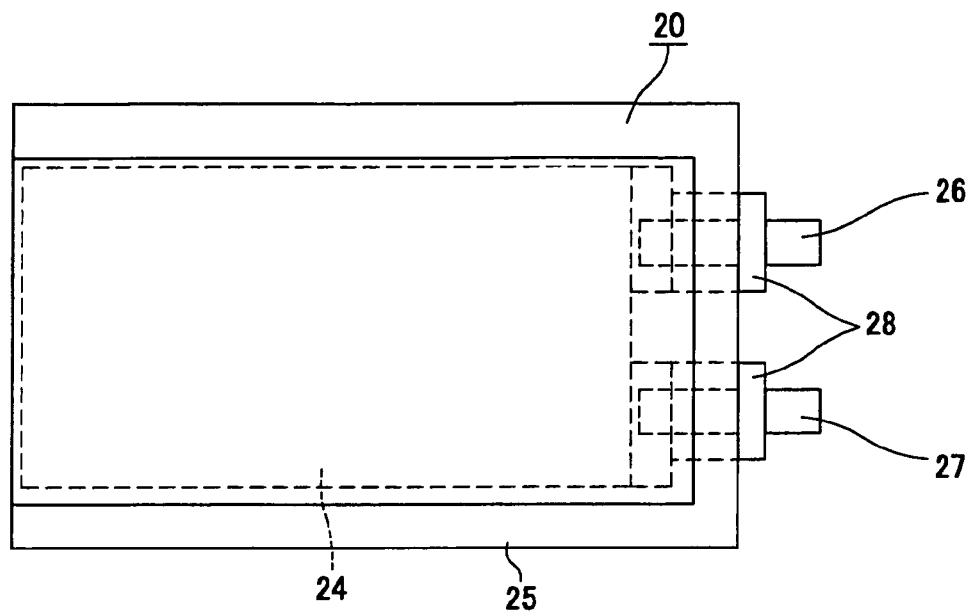
FIG. 2 is a schematic plan view showing one example of a thin non-aqueous electrolyte secondary battery using a gel electrolyte to which the present invention is applied.
Figure 3:
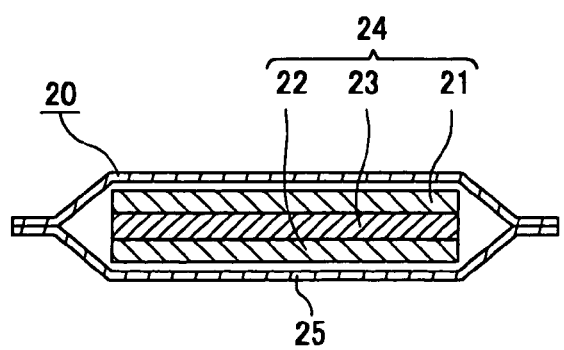
FIG. 3 is a sectional view of the battery shown in FIG. 2.

FIGS. 2 and 3 show a structural example of a non-aqueous electrolyte secondary battery 20 having a thin form. The non-aqueous electrolyte secondary battery 20 has a battery element 24 sealed in an outer package film 25. The battery element 24 is formed by superposing a cathode 21 having a cathode active material layer on an anode 22 having an anode active material layer through a separator 23.

A current collector of the cathode 21 is connected to a cathode lead 26. A current collector of the anode 22 is connected to an anode lead 27. As shown in FIG. 2, resin films 28 are provided between the seal parts of the outer package film 25 and the leads to ensure the insulating characteristics of the cathode lead 26 and the anode lead 27. Parts of the cathode lead and the anode lead are drawn outward.

The active material layers of the cathode 21 and the anode 22 are respectively impregnated with the gel electrolytes and the gel electrolytes are solidified. The cathode 21 is superposed on the anode 22 through the separator 23 in such a manner that the gel electrolyte layers are opposed to each other. Accordingly, the separator 23 is also partly impregnated with the gel electrolyte or a non-aqueous solvent in which electrolyte salt included therein is dissolved.

The non-aqueous electrolyte secondary battery to which the present invention is applied may be formed in an arbitrary form such as a cylindrical type, a prismatic type, a coin type, a button type, etc. The form of the non-aqueous electrolyte secondary battery is not especially limited to a specific form and the size thereof is also arbitrary.

Now, some examples carried out to recognize the effects of the present invention are described below. In the following description, the names of specific compounds and numeric values are used and explained, however, it is to be understood that the present invention is not limited to these examples.

(Sample 1)

In a cathode, as a cathode active material, lithium cobaltate ($LiCoO_2$) of 92 wt %, powdered PVdF of 3 wt % and powdered graphite of 5 wt % were mixed together. The mixture was dispersed in N-methylpyrrolidone (NMP) as a solvent to prepare a cathode composite mixture. The cathode composite mixture was applied to both the surfaces of an aluminum foil serving as a cathode current collector and dried under reduced pressure for 24 hours at 100° C. Further, the obtained product was compressed by a suitably pressurized roll press. The product was cut to a size of 50 mm×300 mm to form a cathode.

As an anode active material, artificial graphite was used. Powdered $CuF_2$ of 0.0369 wt % was added to the graphite. The mixture of graphite and fluoride of 91 wt % was mixed with powdered PVdF of 9 wt %. The obtained mixture was dispersed in NMP to prepare an anode composite mixture. The anode composite mixture was applied to a copper foil and dried under reduced pressure for 24 hours at 100° C. The obtained product was compressed by a suitably pressurized roll press. The product was cut to a size of 52 mm×320 mm to form an anode. The amount of $CuF_2$ included in the electrode was $5.68×10^{-4}$ g, $5.59×10^{-6}$ mol.

As an electrolyte, a PVdF type gel electrolyte was used. The PVdF gel electrolyte and a battery were produced in the following procedure. Firstly, PVdF as a copolymer including hexafluoropropylene of less than 7.7 wt %, electrolyte solution and DMC as a solvent of polymer were mixed, agitated and dissolved together. The electrolyte solution was prepared in such a manner that $LiPF_6$ was dissolved in a mixed solvent in which EC of 60 wt % was mixed with PC of 40 wt % in concentration of 0.9 mol/kg relative to a mass of solvent.

The gel electrolyte in a sol state was applied respectively to the active material films of the cathode and the anode to volatilize a solvent and form gel electrolyte films on the electrodes. Then, a separator made of a micro-porous polyethylene film was prepared to stack the separator, the cathode, the separator and the anode in this order and spirally coil the stacked body in a flat form. Thus, a battery element was formed. The battery element is packed under vacuum by a general purpose aluminum laminate film formed by sandwiching an aluminum foil in between polyolefine films to complete a gel electrolyte secondary battery.

(Sample 2)

A gel electrolyte secondary battery was formed in the same manner as that of the Sample 1 except that an amount of addition of $CuF_2$ relative to graphite was 0.0738 wt %. The amount of $CuF_2$ included in the anode was $1.17×10^{-3}$ g, $1.15×10^{-5}$ mol.

(Sample 3)

A gel electrolyte secondary battery was formed in the same manner as that of the Sample 1 except that an amount of addition of $CuF_2$ relative to graphite was 0.732 wt %. The amount of $CuF_2$ included in the anode was $1.14×10^{-2}$ g, $1.12×10^{-4}$ mol.

(Sample 4)

A gel electrolyte secondary battery was formed in the same manner as that of the Sample 1 except that an amount of addition of $CuF_2$ relative to graphite was 6.72 wt %. The amount of $CuF_2$ included in the anode was $1.17×10^{-1}$ g, $1.15×10^{-3}$ mol.

(Sample 5)

A gel electrolyte secondary battery was formed in the same manner as that of the Sample 1 except that an amount of addition of $CuF_2$ relative to graphite was 9.63 wt %. The amount of $CuF_2$ included in the anode was $1.78×10^{-1}$ g, $1.75×10^{-3}$ mol.

(Sample 6)

A gel electrolyte secondary battery was formed in the same manner as that of the Sample 1 except that $CuF_2$ was not added to graphite.

A charging and discharging test was carried out to the Sample batteries formed as mentioned above.

Initially, a constant-current and constant-voltage charging operation having a current value of 100 mA and a constant-voltage value of 4.20 V was carried out to the batteries respectively until the current value was decreased to 5 mA. After a stop for one hour when the charging operation was completed, a constant-current discharging operation having a current value of 100 mA was carried out until a voltage value reached 3.00 V to measure an initial discharging capacity. Then, after the discharging capacity was measured, a constant-current and constant-voltage operation having a constant-current value of 500 mA and a constant-voltage value of 4.20 V which was carried out until the current value was decreased to 20 mA and a constant-current discharging operation having a current value of 500 mA which was carried out up to an end voltage of 3.00 V were considered to constitute one cycle. They were repeated to measure a change of discharging capacity for each cycle. A discharging capacity maintaining/retention ratio was calculated as a ratio of a discharging capacity of 300th cycle relative to a discharging capacity of 5th cycle, that is, (discharging capacity of 300th cycle/discharging capacity of 5th cycle)×100.

A quantity of electricity necessary for completely reducing the fluoride $MF_n$ in accordance with the above-described expression (2) is mnF [C]. Here, m indicates the number of mols of the fluoride and F indicates a Faraday constant. Since only the anode consumes the quantity of electricity, a capacity loss is generated for the battery. When units are set for comparison with a battery capacity, a ratio R [%] of the discharging capacity relative to an initial charging capacity Q [mAh] of the battery is represented by the following expression (4). The R-values were also examined.

$$R = (mnF/3.6\,Q) \times 100 \qquad (4)$$

The measured results of the charging capacities, the discharging capacities, the discharging capacity maintaining/retention ratios, and the R-values of the batteries are respectively shown in Table 1.

TABLE 1

|  | Fluoride (mol) | Initial Charging Capacity (mAh) | Initial Discharging Capacity (mAh) | Discharging Capacity Maintaining/retention Ratio (%) | R-value (%) |
|---|---|---|---|---|---|
| Sample 1 | $5.59 × 10E^{-6}$ | 600 | 500 | 81.5 | 0.05 |
| Sample 2 | $1.15 × 10E^{-5}$ | 600 | 500 | 85.5 | 0.1 |

TABLE 1-continued

|  | Fluoride (mol) | Initial Charging Capacity (mAh) | Initial Discharging Capacity (mAh) | Discharging Capacity Maintaining/retention Ratio (%) | R-value (%) |
|---|---|---|---|---|---|
| Sample 3 | $1.12 \times 10E^{-4}$ | 602 | 496 | 89.2 | 1 |
| Sample 4 | $1.15 \times 10E^{-3}$ | 612 | 462 | 90.2 | 10 |
| Sample 5 | $1.75 \times 10E^{-3}$ | 625 | 442 | 89.3 | 15 |
| Sample 6 | 0 | 600 | 500 | 81 | 0 |

As apparent from the Table 1, in the batteries of the Samples 1 to 5 in which the fluoride $MF_n$ was included in the anodes, the discharging capacity maintaining/retention ratios higher than that of the battery of the Sample 6 in which the fluoride $MF_n$ was not included were obtained. When the R-values become larger, the initial discharging capacities are apparently the more reduced. It was apparently recognized from the Samples 2 to 4 that the R-value was preferably located within a range represented by an expression of $0.1 \leq R \leq 10$ especially in order to make high energy density and good charging and discharging cyclic characteristics compatible with each other. When the amount of the fluoride is represented by the number of mols m of the fluoride $MF_n$ by using the above-described expression (4), a below-described expression (5) is obtained.

$$0.0036\ Q/nF \leq m \leq 0.36\ Q/nF \qquad (5)$$

When the amount m of addition of the fluoride is excessively smaller than 0.0036 Q/nF [mol] (Sample 1), an effect of improving cyclic characteristics is not exhibited. Further, when the amount m of addition of the fluoride is excessively larger than 0.36 Q/nF [mol] (Sample 5), charging and discharging cyclic characteristics are improved, however, a battery capacity is decreased.

The present invention is not limited to the above-described embodiments explained by referring to the drawings. As apparent for a person with ordinary skill in the art, various changes, substitutions or equivalence thereto may be made without departing the attached claims and the gist thereof.

INDUSTRIAL APPLICABILITY

As described above, since the non-aqueous electrolyte secondary battery according to the present invention includes the fluoride $MF_n$ in the anode before the initial charging operation, the metal fluoride is reduced upon initial charging operation and a film with good quality is properly formed by a reaction product. This film can prevent the reaction of the anode with the electrolyte solution. Accordingly, an excellent non-aqueous electrolyte secondary battery in which high energy density and output density are made compatible with excellent charging and discharging cyclic characteristics is obtained.

The invention claimed is:

1. A non-aqueous electrolyte secondary battery having an anode, a cathode and an electrolyte, wherein a fluoride $MF_n$ is included in the anode before an inital charging operation, wherein M indicates at least one metal selected from Cu, Ni, Ag, Ti, Sn and Cr; and an amount m [mol] of the fluoride $MF_n$ included in the anode is located within a range represented by the following equation $$0.0036\ Q/nF \leq m \leq 0.36\ Q/nF;\ \text{and}$$

where Q represents the initial charging capacity of the battery, F represents a Faraday constant, and wherein n is an integer, wherein the flouride $MF_n$ is $CuF_2$ or a hydrate thereof.

2. The non-aqueous electrolyte secondary battery having an anode, a cathode and an electrolyte, wherein a fluoride $MF_n$ is include in the anode before an initial charging operation, wherein M indicates at least one metal selected from Cu, Ni, Ag, Ti, Sn and Cr; and an amount m [mol] of the fluoride $MF_n$ included in the anode is located within a range represented by the following equation $$0.0036\ Q/nF \leq m \leq 0.36\ Q/nF;\ \text{and}$$

wherein Q represents the initial capacity of the battery, F represents a Faraday constant, and wherein n is an integer, wherein the fluoride $MF_n$ is $NiF_2$ or a hydrate thereof.

* * * * *